US008452754B2

(12) United States Patent
Narasayya et al.

(10) Patent No.: US 8,452,754 B2
(45) Date of Patent: May 28, 2013

(54) STATIC ANALYSIS FRAMEWORK FOR DATABASE APPLICATIONS

(75) Inventors: Vivek R. Narasayya, Redmond, WA (US); Arjun Dasgupta, Arlington, TX (US); Manoj A. Syamala, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 288 days.

(21) Appl. No.: 12/463,336

(22) Filed: May 8, 2009

(65) Prior Publication Data

US 2010/0287214 A1    Nov. 11, 2010

(51) Int. Cl.
*G06F 7/00* (2006.01)
*G06F 17/30* (2006.01)

(52) U.S. Cl.
USPC ............................ 707/713; 707/759; 707/760

(58) Field of Classification Search
USPC .................................. 707/687, 713, 759, 760
See application file for complete search history.

(56) References Cited

U.S. PATENT DOCUMENTS

| | | | | |
|---|---|---|---|---|
| 5,471,596 A | * | 11/1995 | Brown, III | 707/999.103 |
| 5,689,698 A | * | 11/1997 | Jones et al. | 707/999.004 |
| 5,819,251 A | * | 10/1998 | Kremer et al. | 707/999.104 |
| 5,987,452 A | * | 11/1999 | Kung | 707/999.003 |
| 6,067,542 A | * | 5/2000 | Carino, Jr. | 707/999.004 |
| 6,098,062 A | * | 8/2000 | Janssen | 706/59 |
| 6,266,658 B1 | * | 7/2001 | Adya et al. | 707/999.003 |
| 6,442,566 B1 | * | 8/2002 | Atman et al. | 707/603 |
| 6,457,020 B1 | * | 9/2002 | Carey et al. | 707/714 |
| 7,207,065 B2 | | 4/2007 | Chess et al. | |
| 2003/0115212 A1 | * | 6/2003 | Hornibrook et al. | 707/103 R |
| 2003/0225768 A1 | * | 12/2003 | Chaudhuri et al. | 707/10 |
| 2003/0229635 A1 | * | 12/2003 | Chaudhuri et al. | 707/6 |
| 2004/0003004 A1 | * | 1/2004 | Chaudhuri et al. | 707/200 |
| 2005/0015752 A1 | | 1/2005 | Alpern et al. | |
| 2005/0289182 A1 | * | 12/2005 | Pandian et al. | 707/104.1 |
| 2006/0212941 A1 | | 9/2006 | Bronnikov et al. | |
| 2006/0253473 A1 | * | 11/2006 | Agrawal et al. | 707/100 |
| 2007/0038618 A1 | * | 2/2007 | Kosciusko et al. | 707/4 |
| 2007/0055658 A1 | * | 3/2007 | Hsiao et al. | 707/4 |
| 2008/0034425 A1 | | 2/2008 | Overcash et al. | |
| 2008/0071785 A1 | * | 3/2008 | Kabra et al. | 707/9 |
| 2008/0183688 A1 | * | 7/2008 | Chamdani et al. | 707/4 |
| 2008/0189251 A1 | * | 8/2008 | Branscome et al. | 707/3 |

(Continued)

FOREIGN PATENT DOCUMENTS

WO    WO2008051855 A1    5/2008

OTHER PUBLICATIONS

Wikipedia, Databse management system, Printout form internet, Mar. 19, 2012, 13 pages.*

(Continued)

*Primary Examiner* — Phong Nguyen
(74) *Attorney, Agent, or Firm* — Lee & Hayes, PLLC

(57) ABSTRACT

A tool facilitating static analysis for database applications, such that the static analysis tool (SAT) can significantly enhance the ability for developers to identify security, correctness and performance problems in database applications during the development phase of an application lifecycle. A static analysis tool for database applications presents a framework for database applications using the ADO.NET data access APIs. The SAT framework consists of a core set of static analysis services upon which verticals such as workload extraction, SQL injection detection, identifying data integrity violations, and SQL performance analysis are built using the core services.

19 Claims, 10 Drawing Sheets

U.S. PATENT DOCUMENTS

| | | | |
|---|---|---|---|
| 2008/0243916 A1* | 10/2008 | Liu | 707/103 Z |
| 2009/0234800 A1* | 9/2009 | Antani et al. | 707/2 |
| 2009/0254532 A1* | 10/2009 | Yang et al. | 707/4 |
| 2009/0319486 A1* | 12/2009 | Surlaker et al. | 707/3 |
| 2010/0005077 A1* | 1/2010 | Krishnamurthy et al. | 707/4 |
| 2010/0042572 A1* | 2/2010 | Al-Beik et al. | 706/47 |
| 2010/0185645 A1* | 7/2010 | Pazdziora | 707/760 |

OTHER PUBLICATIONS

Agrawal, et al., "Automatic Physical Design Tuning: Workload as a Sequence", retrieved on Mar. 3, 2009 at <<http://delivery.acm.org/10.1145/1150000/1142549/p683-agrawal.pdf?key1=1142549&key2=4032716321&coll=GUIDE&dl=GUIDE&CFID=24575451&CFTOKEN=21527587>>, SIGMOD 2006, Jun. 27-29, 2006, Chicago, IL., pp. 683-694.

Agrawal, et al., "Database Tuning Advisor for Microsoft SQL Server 2005", retrieved on Mar. 3, 2009 at <<http://www.vldb.org/conf/2004/IND4P3.PDF>>, Proceedings of the 30th VLDB Conference, Toronto, Canada, 2004, pp. 1110-1121.

Barham, etla., "Using Magpie for request extraction and workload modelling", retrieved on Mar. 3, 2009 at <<http://www.cs.wisc.edu/areas/os/ReadingGroup/OS/papers/magpie-osdi-04.pdf>>, Microsoft Research, Cambridge, UK., 14 pages.

Box, et al., "LINQ: .NET Language-Integrated Query", retrieved on Mar. 3, 2009 at <<http://msdn.microsoft.com/en-us/library/bb308959.aspx>>, Feb. 2007, 25 pages.

Bruno, et al., "Towards Declarative Queries on Adaptive Data Structures", retrieved on Mar. 3, 2009 at <<http://research.microsoft.com/pubs/74118/conanLastPDF.pdf>>, Microsoft, USA, 10 pages.

Chaudhuri, et al., "Bridging the Application and DBMS Profiling Divide for Database Application Developers", retrieved on Mar. 3, 2009 at <<http://www.vldb.org/conf/2007/papers/industrial/p1252-chaudhuri.pdf>>, VLDB 2007, Sep. 23-28, 2007, Vienna, Austria, pp. 1252-1262.

Cheung, et al., "Performance Profiling with EndoScope, an Acquisitional Software Monitoring Framework", retrieved on Mar. 3, 2009 at <<http://db.csail.mit.edu/pubs/asp-cr.pdf>>, VLDB 2008, Aug. 24-30, 2008, Auckland, New Zealand, 12 pages.

Dageville, et al., "Automatic SQL Tuning in Oracle 10g", retrieved on Mar. 3, 2009 at <<http://www.vldb.org/conf/2004/IND4P2.PDF>>, Proceedings of the 30th VLDB Conference, Toronto, Canada, 2004, pp. 1098-1109.

"Eclipse.org", retrieved on Mar. 3, 2009 at <<http://www.eclipse.org>>, 2009 The Eclipse Foundation, 4 pages.

"FxCop", retrieved on Mar. 3, 2009 at <<http://msdn.microsoft.com/en-us/library/bb429476(VS.80,printer).aspx>>, Microsoft Corporation, 2009, 2 pages.

"Harry Waldron—Corporate and Home Security", retrieved on Mar. 3, 2009 at <<http://myitforum.com/cs2/blogs/hwaldron/archive/2008/06/27/url-scan-3-0-beta-new-version-helps-detect-sql-injection-attacks.aspx>>, myITforum.com, Inc., 2007, 2 pages.

"HP Diagnostics Software", retrieved on Mar. 3, 2009 at <<http://www.mercury.com/us/products/diagnostics/>>, 2009 Hewlett-Packard Development Company, L.P., 2 pages.

Maone, "United Nations VS SQL Injections", retrieved on Mar. 3, 2009 at <<http://hackademix.net/2007/08/12/united-nations-vs-sql-injections/>>, 7 pages.

Martin, et al., "Understanding Software Application Interfaces via String Analysis", retrieved on Mar. 3, 2009 at << http://people.engr.ncsu.edu/txie/publications/icse06er.pdf>>, ICSE 2006, May 20-28, 2006, Shanghai, China, 4 pages.

Maule, et al., "Impact Analysis of Database Scheme Changes", retrieved on Mar. 3, 2009 at <<http://delivery.acm.org/10.1145/1370000/1368150/p451-maule.pdf?key1=1368150&key2=0402716321&coll=GUIDE&dl=GUIDE&CFID=24574909&CFTOKEN=19299331>>, ICSE 2008, May 10-18, 2008, Leipzig, Germany, pp. 451-460.

Meier, et al., "Performance Best Practices at a Glance", retrieved on Mar. 3, 2009 at <<http://msdn.microsoft.com/en-us/library/ms998512.aspx>>, May 2004, Microsoft Corporation, 17 pages.

"Microsoft Source Code Analyzer for SQL Injection Tool—Find SQL Injection Problems", retrieved on Mar. 3, 2009 at <<http://www.pnpguidance.net/post/MicrosoftSourceCodeAnalyzerSQLInjectionToolFindSQLInjectionProblems.aspx>>, 2008 PnPGuidance.net, 4 pages.

"Microsoft Visual Studio 2008", retrieved on Mar. 3, 2009 at <<http://msdn.microsoft.com/vstudio>>, Microsoft Corp. 2009, 1 page.

"Microsoft's Academic Conference Management Service", retrieved on Mar. 3, 2009 at <<http://msrcmt.research.microsoft.com/cmt/>>, Jan. 2009, 3 pages.

"Oracle Application Development Framework", retrieved on Mar. 3, 2009 at <<http://www.oracle.com/technology/products/adf/index.html>>, 1 page.

Otey, "ado.net Loopholes", retrieved on Mar. 3, 2009 at <<http://www.sqlmag.com/Article/ArticleID/22132/sql_server_22132.html>>, Oct. 2001, SQL Server Magazine, 2 pages.

Patton, "Ensure data integrity with validation in asp.net", retrieved on Mar. 3, 2009 at <<http://articles.techrepublic.com.com/5100-10878_11-5794617.html>>, Jul. 22, 2005, 4 pages.

Phoenix: Microsoft Connect retrieved on Apr. 28, 2009 from Http://connect.microsoft.com/Phoenix.

"Microsoft SQL Server 2005: Migration for Oracle", retrieved on Mar. 3, 2009 at <<http://www.microsoft.com/sqlserver/2005/en/us/migration-oracle.aspx>>, Microsoft Corp. 2009, 1 page.

Tata, et al., "On Common Tools for Databases—The Case for a Client-Based Index Advisor", retrieved on Mar. 3, 2009 at <<http://ieeexplore.ieee.org/ielx5/4492761/4498260/04498283.pdf?arnumber=4498283>>, ICDE Workshop 2008, pp. 42-49.

Wassermann, et al., "Sound and Precise Analysis of Web Applications for Injection Vulnerabilities", retrieved on Mar. 3, 2009 at <<http://www.cs.ucdavis.edu/~su/publications/pldi07.pdf>>, PLDI 2007, Jun. 11-13, 2007, San Diego, CA., 10 pages.

Zilio, et al., "DB2 Design Advisor: Integrated Automatic Physical Database Design", retrieved on Mar. 3, 2009 at <<http://www.vldb.org/conf/2004/IND4P1.PDF>>, Proceedings of the 30th VLDB Conference, Toronto, Canada, 2004, pp. 1087-1097.

Aho, et al., "Compilers, Principles, Techniques and Tools", Book, 1986, Addison Wesley, 4 pgs.

Search Together, "Microsoft Search Together (Beta)", retrieved on Apr. 28, 2009 at http://research.microsoft.com/en-us/um/redmond/projects/serachtogether, Mar. 2009, 3 pgs.

* cited by examiner

```
← 700
```

```
File  Edit  View  Project  Debug  Data  Tools  Test  Window  Community  Help   ☐ Full Screen
 Form1.cs
 ⚙STAPort.Form1                           ▼  ⚙button_insert_Click(object sender, EventArgs e)
257      }
258
259      // Called coresponding to click of insert button in the UI
260      // string is build and passed to FillData
261      private void button_insert_Click(object sender, EventArgs e)
262      {
263          string myQuery = "INSERT INTO Products (price,sku,description) ";
264          myQuery += "VALUES (@price,@sku,@description)";
265          FillData(myQuery, 0, "", "");
266      }
267
268
269      private void FillData(string myQuery, double price1, string sku, string desc)
270      {
271      try
272      {
273          SqlConnection myConnection = new
274          SqlConnection(@"Server=local;DataBase=STASampleProductDatabase
275          myConnection.Open();
276
277          SqlCommand myCommand = new SqlCommand(myQuery, myConnection);
278          // If there is a constraint limit the values that are accepted by a column.
279          myCommand.Parameters.Add(new SqlParameter("@price", price1));
280          myCommand.Parameters.Add(new SqlParameter("@sku", sku));
281          myCommand.Parameters.Add(new SqlParameter("@description", desc));
282          myCommand.ExecuteNonQuery();
283          myConnection.Close();
284      }
285      catch (Exception ex)
286      {
287          MessageBox.Show("There was an error filling the tables. Please try again." + es.Message.ToString().
288
289
290
291
292
293
Ready                                                          Ln 267    Col 10    Ch 10    INS
```

Fig. 7

STATIC ANALYSIS FRAMEWORK FOR DATABASE APPLICATIONS

BACKGROUND

Database application developers use integrated development environments (IDEs) to write database applications in programming languages such as C++, C#, Java™ from Sun Microsystems, Inc., etc. Generally, IDEs such as Microsoft Visual Studio® provide tools to help developers develop, debug, and analyze applications during development. Often database applications are written to include data access application programming interfaces (APIs) to make SQL queries from the applications during execution. Examples of data access APIs for executing SQL statements include ADO-.NET, Open Database Connectivity (ODBC), and Java Database Connectivity (JDBC™).

However, current IDEs fail to recognize interactions between applications in development and database management systems (DBMSs). Additionally, relational database management systems (RDBMSs), such as SQL Server® from Microsoft® currently may not recognize when an SQL query made during execution of a database application has been changed or is inconsistent with the application.

SUMMARY

A method and system for leveraging data access APIs and database application binaries to provide a set of analysis services via a Static Analysis Tool (SAT) are described herein. The SAT provides a framework for analyzing database application binaries to automatically identify security, correctness and performance problems in the database application via service tools and vertical tools.

In at least one embodiment, the service tools of the SAT are provided on top of a compiler facilitating the vertical tools. In at least one embodiment the SAT framework supports analysis within a single basic code block, across basic blocks within a function, and across functions.

This summary is provided to introduce a selection of concepts in a simplified form that are further described below in the Detailed Description. This summary is not intended to identify key or essential features of the claimed subject matter, nor is it intended to be used to limit the scope of the claimed subject matter.

BRIEF DESCRIPTION OF THE DRAWINGS

FIG. 7 illustrates an exemplary screenshot of a code sample for applying the Static Analysis Framework for Database Applications in one embodiment.

The same numbers are used throughout the disclosure and figures to reference like components and features.

DETAILED DESCRIPTION

Overview

A Static Analysis Tool (SAT) enables leveraging data access APIs and database application binaries to provide a set of analysis services for database applications. In another aspect, the SAT provides a framework for analyzing database application binaries to automatically identify security, correctness and performance problems in the database application via tools such as service tools and vertical tools.

Services enabled by the tools include: extracting the set of SQL statements that may execute in an application; identifying properties of the SQL statements such as tables and columns referenced; extracting parameters used in the SQL queries and their binding to program variables; extracting properties of how the SQL statement results are used in the application; analyzing user input and their propagation to SQL statements. Verticals built using the above services, enable: detecting SQL injection vulnerability, extracting the SQL workload from application binary, identifying opportunities for SQL query performance optimizations, and identifying potential data integrity violations.

An environment in which these tools may enable these and other techniques is set forth first below. This is followed by other sections describing various inventive techniques and exemplary embodiments of the tools. These sections describe exemplary ways in which the inventive tools enable analysis within a single basic block, across basic blocks within a function, and across functions.

Exemplary Operating Environment

Before describing the tools in detail, the following discussion of an exemplary operating environment is provided to assist the reader in understanding at least one way in which various inventive aspects of the tools may be employed. The environment described below constitutes but one example and is not intended to limit application of the tools to any one particular operating environment. Other environments may be used without departing from the spirit and scope of the claimed subject matter.

Figure 1:
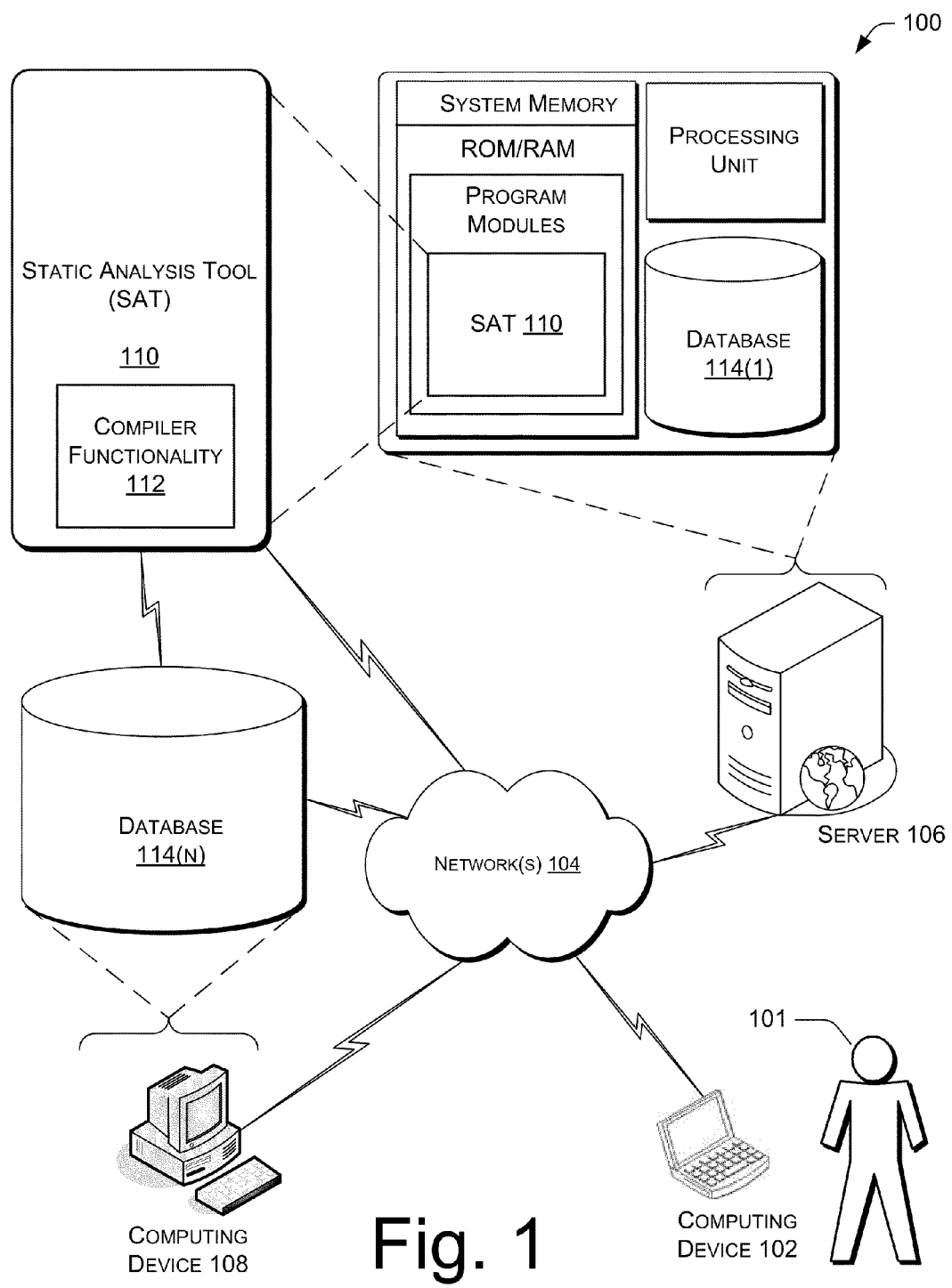
FIG. 1 illustrates an exemplary operating environment for implementing tools applying the Static Analysis Framework for Database Applications.

FIG. 1 illustrates one such operating environment generally at 100 comprising at least one developer 101, a first computing device 102 having one or more processor(s) (not shown) and computer-readable media (not shown).

Computer-readable media can be any available media that can be accessed by a computing device such as computing devices 102, 106, and 108. Computer-readable media includes both volatile and nonvolatile media, removable and non-removable media. By way of example, and not limitation, computer-readable media comprises computer storage media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device such as computing devices 102, 106, and 108.

Computing device 102 may be one of a variety of computing devices, such as a cell phone, laptop computer, desktop computer, personal digital assistant, or server. Each computing device having at least one processor capable of accessing and/or executing instructions embodied on the computer-readable media. The computing device may also include input/output devices such as a keyboard, mouse, microphone, printer, monitor, and speakers (not shown) useable to implement one or more embodiments of the tools described herein.

The operating environment 100 also comprises one or more network(s) 104 and computing device server(s) 106. The network 104 enables communication between the computing device(s) 102, 108, and 106, and can comprise a global or local wired or wireless network, such as the Internet, a local area network (LAN), or an intranet. Computer-readable media of computing devices such as 102 and 108 comprises or has access to a browser, which is a module, program, or other entity capable of interacting with a network-enabled entity such as a server 106. In aspects of several embodiments server(s) 106 may be implemented as a web server, in a server farm, and as content provider(s) providing content from a database 114 upon which a query may be run, and combinations thereof.

In some embodiments, the operating environment 100 may further comprise at least a second computing device 108 having one or more processor(s) and computer-readable media, similar to computing device 102. Each computing device 108 comprises a computing device similar to 102. The computing device(s) 108 may be the same computing device as computing device 102, or can be a separate or different computing device. Further, computing devices 102, 106, and 108 may host or otherwise access any number of databases 114, e.g., database 114(1 ... N).

Aspects of computing devices, such as computing devices 102, 106, 108, in at least one embodiment include functionality for implementing the static analysis framework for database applications algorithm to implement the static analysis tool (SAT) 110 individually or encompassing a compiler functionality 112. For example, as shown from server 106, program modules may be implemented as computer-readable instructions, various data structures, and so forth via at least one processing unit to configure a computer having system memory to apply the SAT 110 with compiler functionality 112 within a single basic block, across basic blocks within a function, and across functions as discussed regarding FIGS. 3 and 6, below. In several embodiments input to the SAT is made up of application binaries, e.g. .exe or .dll files and a database. In at least one embodiment this input is received via network 104, and in some embodiments the input may be received via a commonly hosted or otherwise accessed database such as 114.

Although the subject matter is described in language specific to structural features and/or methodological acts, it is to be understood that the subject matter defined in the appended claims is not necessarily limited to the specific features or acts or to the structural proximity or sequences described herein. Rather, the specific features and acts described are disclosed as exemplary forms of implementing the claims.

Exemplary Architecture

The following discussion describes an exemplary architecture by which the SAT 110 improves analysis of characteristics such as security, performance, and correctness of database application binaries still in development. Code Example 1, below presents an example portion of application source code for a C# application allowing a user to search a product catalog. In this example, the application retrieves rows from a table in a database that contains the user submitted string.

Code Example 1

```
// Event handler for button click
private void onLookupButtonClick(object sender, EventArgs e)
{
    // Get search string from edit box
    1. string searchstring = lookupeditbox.Text;
    // Call the actual function
    2. LookupProduct(searchstring);
}
// Look up the product in database
private void LookupProduct(string searchstring)
{
    // Create a ADO.NET SQLCommand object. Represents a SQL
       statement
    1. string cmdtext = "select sku, description, price from Products
       where description like '%" + searchstring + "%' ";
    2. SqlCommand cmd = new SqlCommand(cmdtext, dbConnection);
    // Does user want to sort the result or not?
    3. if ( SortRows( ) ){ cmdtext += " order by price "; }
    // Sets the SQL statement to execute at the data source.
    4. cmd.CommandText = cmdtext;
    // Execute the query
    5. SQLDataReader rdr = cmd.ExecuteReader( );
    // iterate through results
    6. while (rdr.Read( )){/* add to grid */}
}
```

Figure 2:
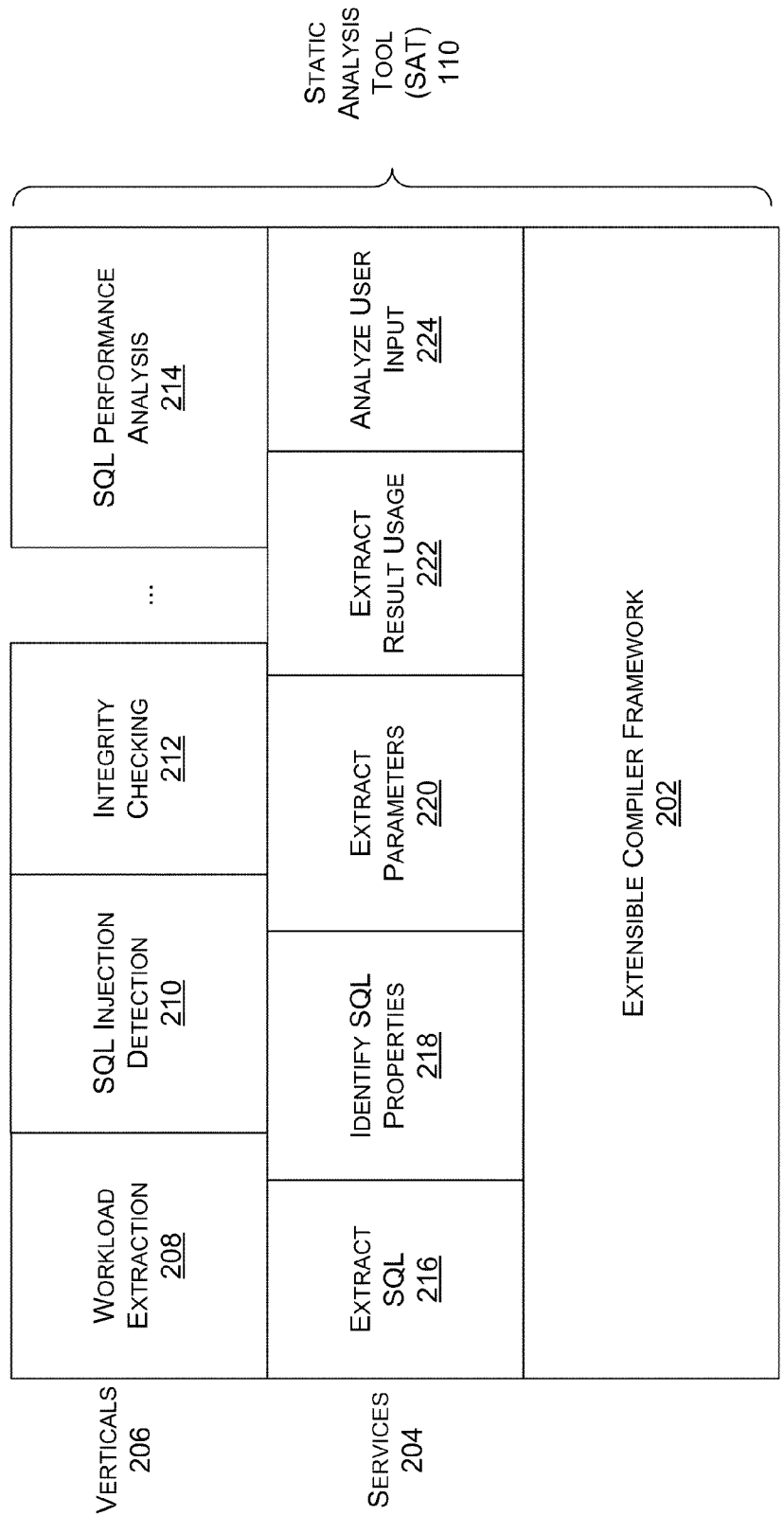
FIG. 2 illustrates an exemplary architecture of one embodiment.

FIG. 2 shows an exemplary architecture 200 of the static analysis tool (SAT) 110. In this exemplary architecture, the Static Analysis Tool (SAT) 110 is built on an extensible compiler framework 202. In at least one embodiment, an extensible compiler framework that can support data and control flow analysis, is preferred. In at least one embodiment, compiler framework 202 is an existing compiler infrastructure such as the Phoenix compiler framework (available at http://connect.microsoft.com/Phoenix), although embodiments with other existing compilers and a compiler integrating the SAT 110 are contemplated and considered within the scope of this disclosure.

The SAT 110 is made up of a layer of static analysis service tools for database applications (services) 204 and a layer of vertical tools (verticals) 206 for database applications. In at least one embodiment verticals 206 are built using services 204 and enable extracting the SQL workload from application binary, detecting SQL injection vulnerability, identifying opportunities for SQL query performance optimizations, and identifying potential data integrity violations.

Workload extraction 208 provides a vertical that identifies, during application development time, the set of SQL statements that can be executed by the application undergoing development. For example, when migrating an application from one DBMS to another, or from one release of a DBMS to the next release of the DBMS, identifying SQL statements issued by the application is important since some statements may need to be modified to adhere to the syntax and restrictions of the target DBMS. Another example of workload extraction is physical design tuning. While today's DBMSs have tools for tuning physical design that take as input a workload and recommend an appropriate physical design, extracting a workload from an application binary facilitates improved initial physical design for the database. This enables less costly refinement after the application is deployed.

Because query strings may be constructed across multiple functions, extraction of the workload can be non-trivial for arbitrary database applications. In the code sample presented in Code Example 1, two possible SQL queries can execute at Line 5—the second query is executed if SortRows( ) in Line 3 returns TRUE.

(1) select sku, description, price from Products where description like '%@p1%'
(2) select sku, description, price from Products where description like '%@p1%' order by price In the above example, the workload was a set of SQL statements. It can also be useful to extract sequences of SQL statements, e.g., a sequence such as: CREATE TABLE T, INSERT INTO T . . . , SELECT . . . FROM S, T, WHERE . . . , DROP TABLE T. Capturing such a sequence from a database application binary enables invoking a tool that can tune a sequence of statements.

SQL injection detection 210 provides a vertical that identifies, during application development time, SQL injection vulnerability in the application undergoing development by examining the application binary.

In the example sample of application code presented in Code Example 1, above, the application retrieves rows from a table in a database that contains the user submitted string. In the function onLookupButtonClick the user input is read from an Edit Box control. In turn, the LookupProduct function is invoked. The LookupProduct function does the actual lookup in a Products table using a dynamically constructed SQL query. The query is executed using the ExecuteReader method of the SqlCommand object.

If the user submits a string such as "Microsoft Office 2007", then the following query string is constructed at Line 1 in the LookupProduct function.

select sku, description, price from Products where description like '%Microsoft Office 2007%'

Now consider when a malicious user submits a string such as the following string.

'OR1=1; DROP TABLE Products--

The following query string would now be constructed on Line 1 in the LookupProduct function.

select sku, description, price from Products where description like '%' OR 1=1; DROP TABLE Products -- %'

Thus, the original intent of the query would be modified due to the concatenation of user input. As a result, when the query is executed on Line 5, this has the undesirable effects of first returning all rows in the Products table to the user and then dropping the table.

As the example above illustrates, catching an SQL injection vulnerability is important. Tools such as SAT 110 also need to not return an excessive number of false positives. For example, many application developers correctly use the ADO.NET APIs for passing user input as a parameter to a SQL query (e.g. AddParameter method). In such cases, the SQL injection detection vertical 210 detects that there is no injection vulnerability since the DBMS cannot interpret the user input as code.

Integrity checking 212 provides a vertical that identifies, during application development time, database integrity constraints in the application undergoing development by examining the application binary. Database integrity constraints may be enforced in the application layer and not the database layer to avoid operational disruptions since it is often easier to deploy a modified application module. For example, in hosted web service scenarios, the cost of altering an existing table may be more than deploying the modified application module.

Another example relates to performance cost where integrity constraint checking in DBMSs can be expensive. For example, if the application developer wants to enforce in the application code the constraint that the price column of the Products table always has a value >0, Code Example 2 may be used.

Code Example 2

```
// Create a ADO.NET SQLCommand object for an INSERT statement
1.  string myQuery = "INSERT INTO Products
    (price,sku,description)
    VALUES(@price,@sku,@description)";
2.  SqlCommand cmd = new SqlCommand(myQuery, dbConnection);
//  Bind program variables to the parameters
3.  cmd.Parameters.Add(new SqlParameter("@price", myprice));
4.  cmd.Parameters.Add(new SqlParameter("@sku", mysku));
5.  cmd.Parameters.Add(new SqlParameter("@description",
    mydesc));
//  Execute the insert statement
6.  cmd.ExecuteNonQuery( );
```

Figure 8:
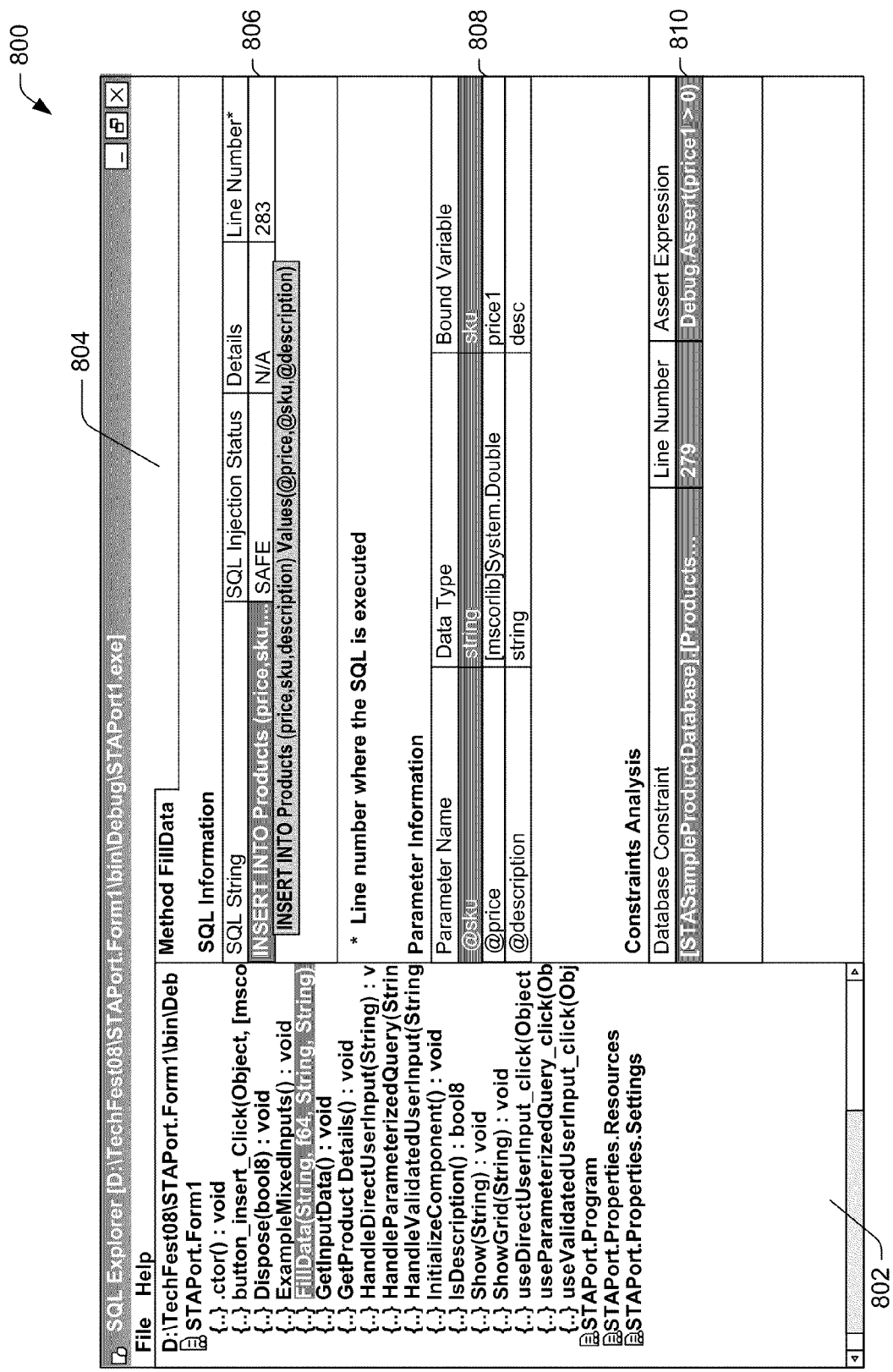
FIG. 8 illustrates an exemplary interface of the SAT including constraints analysis.

Given a constraint such as [DBName].[Products].[price]>0 as input, integrity checking vertical 212 enables automatically identifying all places in the application code where the price column can potentially be updated, and enables adding an assertion at such places in the code. For example, in the above code section, integrity checking vertical 212 would automatically recommend inserting the code "Assert (myprice>0)" before Line 3 to validate the given data integrity constraint [DBName].[Products].[price]>0. In order to provide such a recommendation, SAT 110 via integrity checking vertical 212: determines that a data manipulation language (DML) statement affecting the price column is occurring in the application code, and identifies the program variable/expression that is bound to the price column in the DML statement. FIG. 8, below, represents a screenshot produced by the SAT 110, after analysis is complete.

SQL Performance Analysis 214 provides a vertical that identifies, during application development time, opportunities for improved query performance in the application undergoing development by examining the application binary and alerting the developer of the ability to improve performance. For example, code such as shown in Code Example 3, below, may include queried columns that are not consumed.

Code Example 3

```
1.   cmd.CommandText = "select sku, price, description from Products";
// Execute the query
2.   SQLDataReader rdr = cmd.ExecuteReader( );
// iterate through results
3.   while (rdr.Read( )){
4.       s = rdr[0]; // use sku value
5.       p = rdr[1]; // use price value
    }
```

Although there are three projection columns in the query "sku", "price", and "description", the application references only two "sku" and "price" when consuming the query results. Thus, in this example, SAT 110 via SQL Performance Analysis vertical 214 detects this and alerts the developer so that the query performance can be improved by rewriting the query as "select sku, price from Products".

Other functionality is contemplated as a part of the illustrated verticals 206 or via similar individual verticals of SAT 110. For example, a development manager for an application may want to enforce a set of best practices in coding for all developers in the project. Such a best practices vertical may be implemented as part of or as a combination of integrity checking 212, SQL performance analysis 214, or others of the illustrated verticals; alternately, a separate best practices vertical (not shown) could be implemented as a part of verticals 206. The following illustrate examples that could be included in such a best practices vertical.

(a) For a query that returns only one row (e.g. SELECT COUNT(*) FROM T ...) the application should use the ExecuteScalar( ) API (rather than ExecuteReader( )) since it is more efficient.
(b) There should be no "SELECT * ..." queries since this can break the application if the schema of the underlying tables change. Instead applications must explicitly enumerate all columns in the project clause of the query.
(c) Avoid data type mismatches. When a program variable that is bound to a database column has a different data type than the column, it can result in unexpected application behavior at runtime. Detecting such mismatches at compile time allows a developer to potentially correct the problem before the application goes into production.

Such verticals of the SAT 110 leverage understanding of the data access APIs (e.g. SQLCommand.ExecuteReader is an API through which a query is executed in ADO.NET).

In addition, the SAT 110 for some of the examples may implement a deeper analysis via access to the database schema, SQL parser, and the query optimizer of the DBMS. One such example occurs when rewriting of the query is recommended. In order to quantify the estimated improvement in performance by such a rewriting, a query optimizer may be used to obtain the execution plan of the original and rewritten queries.

Verticals 206 have significant commonality. For example, the need to extract the SQL statements that can execute at a particular ExecuteReader( ) call in a program is common to both Workload Extraction 208 and SQL Performance Analysis 214. Similarly, identifying properties of the SQL such as which columns are referenced is important in Workload Extraction 208 and Integrity Checking 212. Thus, Services 204 comprises a library of services for database applications utilized to develop Verticals 206. In at least one embodiment, Services 204 is built on top of a compiler framework 202. Services 204 of the exemplary SAT 110 comprises five services of use in implementing verticals 206.

Extract SQL 216, during application development time, provides a service that given a function in the program binary, returns a set of SQL statement handles. A handle is a unique identifier that is a (line number, ordinal) pair in that function. The handle represents a SQL statement that can execute at that line number. Referring to the LookupProduct function in Code Example 1, above, Extract SQL 216 returns two handles (e.g. (5,1), (5,2)), corresponding to the two statements that can execute at line number 5 (the ExecuteReader( ) invocation in the function).

The Extract SQL service 216 may be configured to extract a specified portion of the SQL that may be executed by the application. For example, when the table names in the query are generated dynamically, the strings extracted by static analysis will not be syntactically valid SQL statements due to their dynamic nature. Another example is the presence of an "IN" clause in the query, where the values in the IN clause are generated inside a loop in the program. However, in real world database applications a large fraction of the SQL executable by the application may be extracted by static analysis alone.

During the application development time Identify SQL Properties 218 provides a service that, given a handle to a SQL statement, returns properties of the SQL statement. In at least one embodiment Identify SQL Properties 218 identifies the following properties: (1) the SQL string itself; (2) number and database types of columns in the result of the SQL statement (for SELECT statements); (3) tables and columns referenced in the statement; and (4) optimizer estimated cost of statement. Identify SQL Properties 218 identifies (2), (3) and (4) above via access to the database schema, an SQL parser, and obtaining the execution plan for a given SQL statement. In at least one embodiment, when extracted SQL indicates a derived property Identify SQL Properties 218 derives the property.

In at least one embodiment Identify SQL Properties 218 may obtain the database connection to use when accessing the database in multiple ways in a variety of embodiments. Examples of ways Identify SQL Properties 218 obtains a database connection to use when accessing the database include from a configuration file, automatically by Identify SQL Properties 218 analyzing the connection string used in the application, and via user input.

Extract Parameters 220, during application development time, provides a service that given a handle to a SQL statement, returns the parameters of the statement along with the program variable/expression that is bound to the respective parameter, and the program variable/expression data type in the application. For example, referring to Integrity Checking 212, the Extract Parameters 220 service returns {((@price, myprice, double), (@sku, mysku, int), (@description, mydescription, String)}.

Extract Result Usage 222, during application development time, provides a service that given a handle to a SQL statement, returns properties of how a result set is consumed in the application. In particular, Extract Result Usage 222 returns each column in the result set that is bound to a variable in the program, along with the type of the bound program variable. Referring to SQL Performance Analysis 214, the Extract Result Usage 222 service returns {(0, s, int), (1, p, double)} assuming the types of variables s and p are int and double respectively.

Analyze User Input 224, during application development time, provides a service that given a handle to a SQL statement, identifies all user inputs in the program such that the user input value v satisfies a "contributes to" relationship to the SQL string of the statement. A contributes to relationship is defined as either: (a) v is concatenated into the SQL string; or (b) v is passed into a function whose results are concatenated into the SQL string in at least one embodiment.

Exemplary Operation

Figure 3:
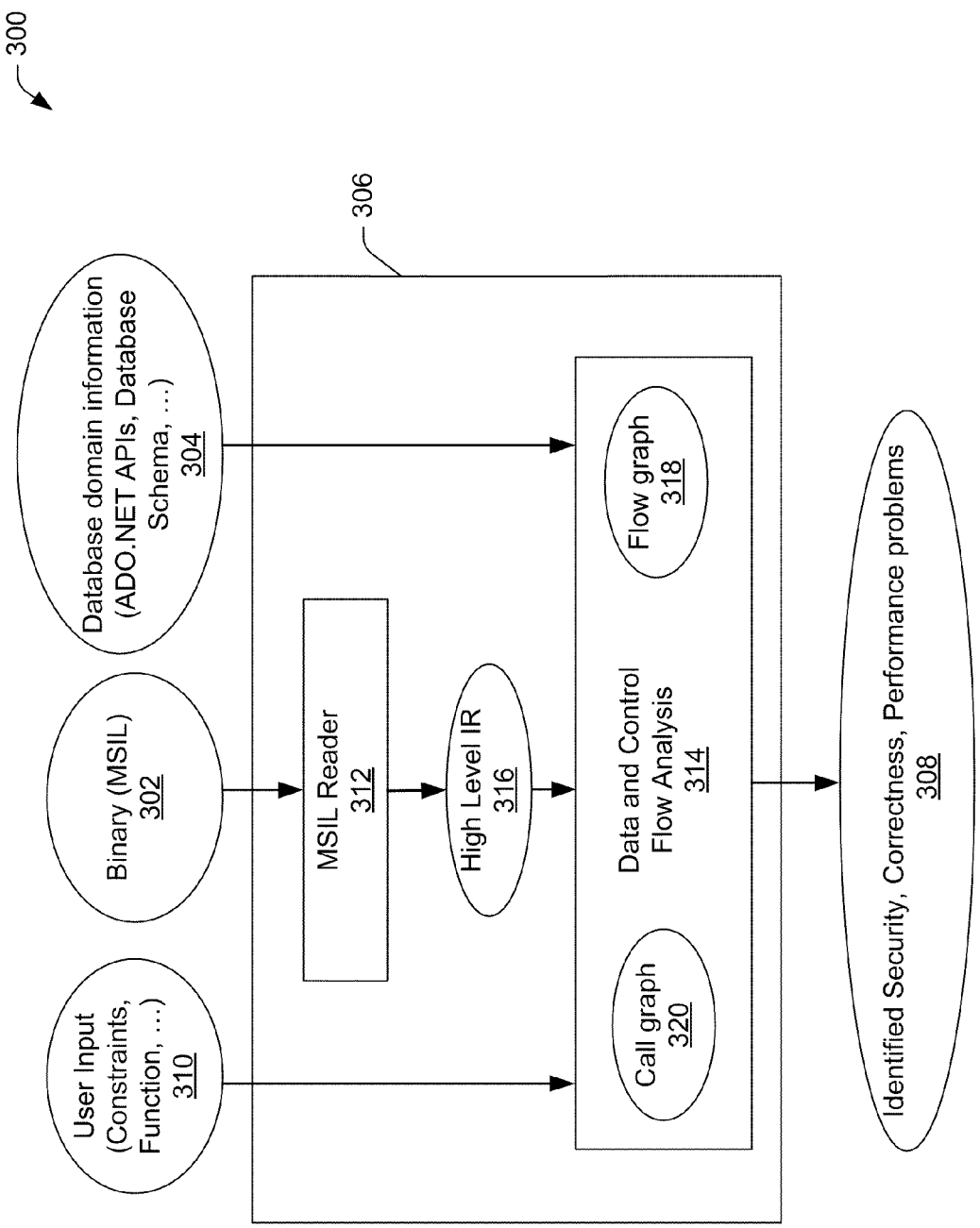
FIG. 3 illustrates an exemplary overview of an implementation of one embodiment.

The following discussion of FIG. 3 describes an exemplary overview operation 300 of at least one embodiment of the static analysis framework for database applications. The discussion references elements discussed above regarding FIGS. 1 and 2. This implementation takes as input an application binary 302 (e.g., a DLL or EXE) and database domain information 304 (e.g., a database schema, data access APIs, ADO-.NET, etc. and at 306 performs custom static analysis on the binary via the SAT 110. In this example, output 308 is a set of security, performance and correctness problems as identified by the vertical tools 206. For certain verticals 206, e.g. identifying potential violations of data integrity constraints 212, the user can specify a set of constraints (e.g. Products.Price>0) as user input (e.g., constraints, functions, etc.) illustrated at 308. Also, based on user input 310, static analysis on the binary at 306 via the SAT 110 may be customized to analyze one or more functions, up to all of the function units in the binary.

The exemplary implementation illustrated relies upon a compiler framework 202 to build out the SAT 110 services 204 and verticals 206 to perform static analysis on the binary of the database application at 306. In at least one other implementation the SAT 110 services 204 and verticals 206 may be implemented independently from compiler framework 202 to perform static analysis on the binary of the database application at 306.

In the illustrated example, compiler framework 202 converts the application binary in Microsoft Intermediate Language (MSIL) illustrated at 302 into an intermediate representation (IR) 316 upon which the the SAT 110 operates to perform static analysis at 306.

In one aspect of the example, compiler framework 202 via the SAT 110 services 204 and verticals 206 performance of static analysis on the binary of the database application at 306 iterates over function unit(s) within the binary. In at least one implementation, the iteration is based at least in part on user input 310, although in other implementations no user input 310 need be involved. In another aspect of the example, compiler framework 202 via the SAT 110 services 204 and verticals 206 performance of static analysis on the binary of the database application at 306 effects data and control flow analysis 314. In yet another aspect of the example, compiler framework 202 via the SAT 110 services 204 and verticals 206 performance of static analysis on the binary of the database application at 306 iterates over individual instructions in the IR 316 within a basic block. In still another aspect of the example, compiler framework 202 via the SAT 110 services 204 and verticals 206 performance of static analysis on the binary of the database application at 306 provides extensions to dynamically extend the framework types like function units and basic blocks. In yet another aspect of the example, compiler framework 202 via the SAT 110 services 204 and verticals 206 performance of static analysis on the binary of the database application at 306 provides a flow graph 318 in order to iterate over basic blocks within a function unit. In yet another aspect of the example, compiler framework 202 via the SAT 110 services 204 and verticals 206 performance of static analysis on the binary of the database application at 306 provides a call graph 320 that represents the control flow across function units. For example, referring to Code Example 1, above, when there is a call to function LookupProduct from the function onLookupButtonClick at Line number 2.

An example of intermediate representation (IR) instructions for the function onLookupButtonClick follows as Code Example 4.

Code Example 4

```
// IR corresponding to Line 1
tv272 = ASSIGN [this]*"STAPort.Form1:: lookupeditbox"
tv273 = CALLVIRT* System.Windows.Forms.Control:: get_Text,
tv272
searchstring = ASSIGN tv273
// IR corresponding to Line 2
{*CallTag} = CALL* &STAPort.Form1:: LookupProduct, this,
searchstring, {*CallTag}, $L5(EH)
```

In at least one embodiment data structure and control flow analysis 314 for a single basic block, for example, (also referred to as a block) is performed via the following operations. Each block represents a sequence of IR instructions. The control flow of the program enters a block at its first instruction and proceeds sequentially through the instructions in the block until it reaches the block's last instruction. The IR instructions corresponding to the function onLookupButtonClick is shown in the code snippet, above. Each IR instruction can be mapped into destination operand, opcode and source operands. In the example above, for the second instruction, the destination operand is tv273, the opcode is CALLVIRT, and the source operands are System.Windows.Forms.Control::get_Text and tv272.

Figure 4:
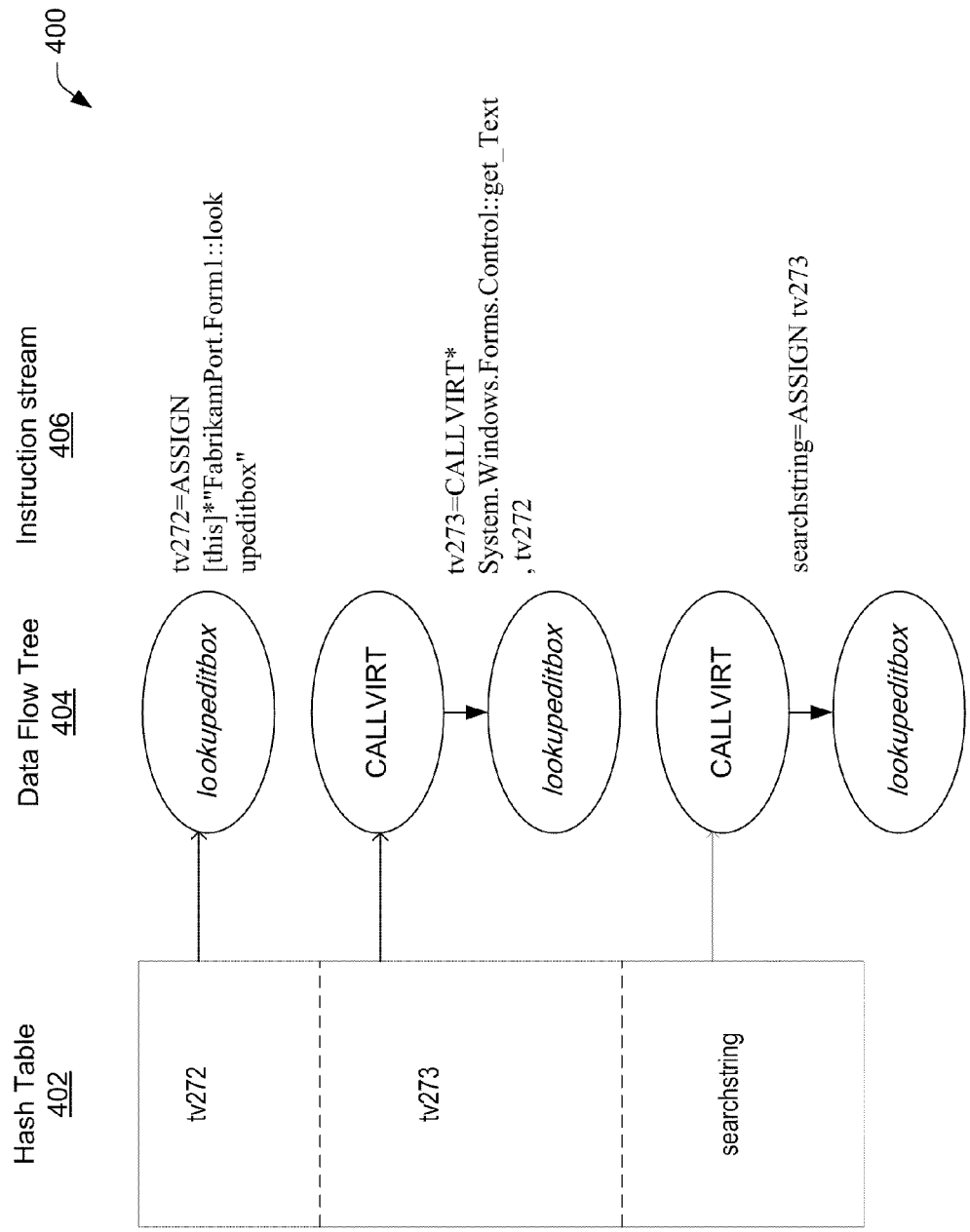
FIG. 4 illustrates an exemplary hash table generated by an embodiment of an exemplary static analysis tool (SAT) operating on an exemplary block with a corresponding exemplary data flow tree and instruction stream.

SAT 110 maintains a hash table as a data structure that at any point during the analysis captures the current values of the operands referenced in instructions in the basic block. For example, as illustrated in FIG. 4 at 400, the hash table 402 is created after executing the instructions above. Hash table 402 has the destination operand as the key (e.g. temporary variable tv273 in the example) and associates the key with a data flow tree 404. The tree contains nodes that hold the operands and opcode. This may be understood as similar to algebraic expression trees. The leaf nodes are other operands or symbols, while the non-leaf nodes are the opcodes. When an assignment to an operand is encountered in the instruction stream 406 (e.g. ASSIGN IR) the assignment results in replacing the current tree associated with the operand with the data flow tree 404 of the source operand that was assigned. Data flow tree 404 is flexible and may be constructed using a variety of algorithms. Examples of such algorithms may be found in A. Aho, R. Sethi, and J. Ullman. Compilers. Principles, Techniques and Tools. Addison Wesley. (1986).

In addition to the operand/opcode information, each node of the data flow tree 404 also stores and propagates information for static analysis services 204. Examples of such information include: symbols that are referenced by the node, line number associated with the node, whether the node is an ADO.NET object (e.g., SQLConnection, SQLCommand, SQLDataReader), and whether the node is part of a string concatenation operation.

By customizing what information is stored in each node, SAT 110 exposes each of the static analysis services 204. For example, to expose the user input analysis service 224 the operand/symbol referenced in a user input function is tracked. This information is propagated through the data flow analysis and thus it enables SAT 110 to track whether the given user input value can contribute to a SQL string issued at a call site.

SAT 110 facilitates exploiting knowledge of data access APIs for data flow analysis. The static analysis services for database applications 204 leverages database domain information including knowledge of data access APIs and the DBMS itself. For example, upon encountering an instruction that calls the following ADO.NET API: System.Data.SqlClient.SqlCommand::ExecuteReader. SAT 110 identifies ExecuteReader as an API for executing a SQL statement. SAT 110 can also identify (based on the signature of the API method) that the first argument to the ExecuteReader is an SQLCommand object and thus is the second source operand in the instruction. SQLCommand objects have properties like the text of a command, parameter list, the active SQLConnection object etc. The data flow analysis (described regarding a basic block, above) will give the current values of the various properties of the SQLCommand object including its text field. For example, the text field of the SQLCommand object is the SQL string that is executed at the ExecuteReader instruction.

As a specific example, the call to ExecuteReader (Line 5 of LookupProduct method in Code Example 1) has the following IR representation:

"tv306=CALLVIRT* &[System.Data] System.Data.Sql-Client.SqlCommand::ExecuteReader, cmd"

Here tv306 is the destination operand, CALLVIRT is the opcode and &[System.Data]System.Data.SqlClient.Sql-Command::ExecuteReader, cmd are respectively the first and second source operands. Thus, SAT 110 is able to infer that the symbol cmd references an ADO.NET SQLCommand Object.

Figure 5:
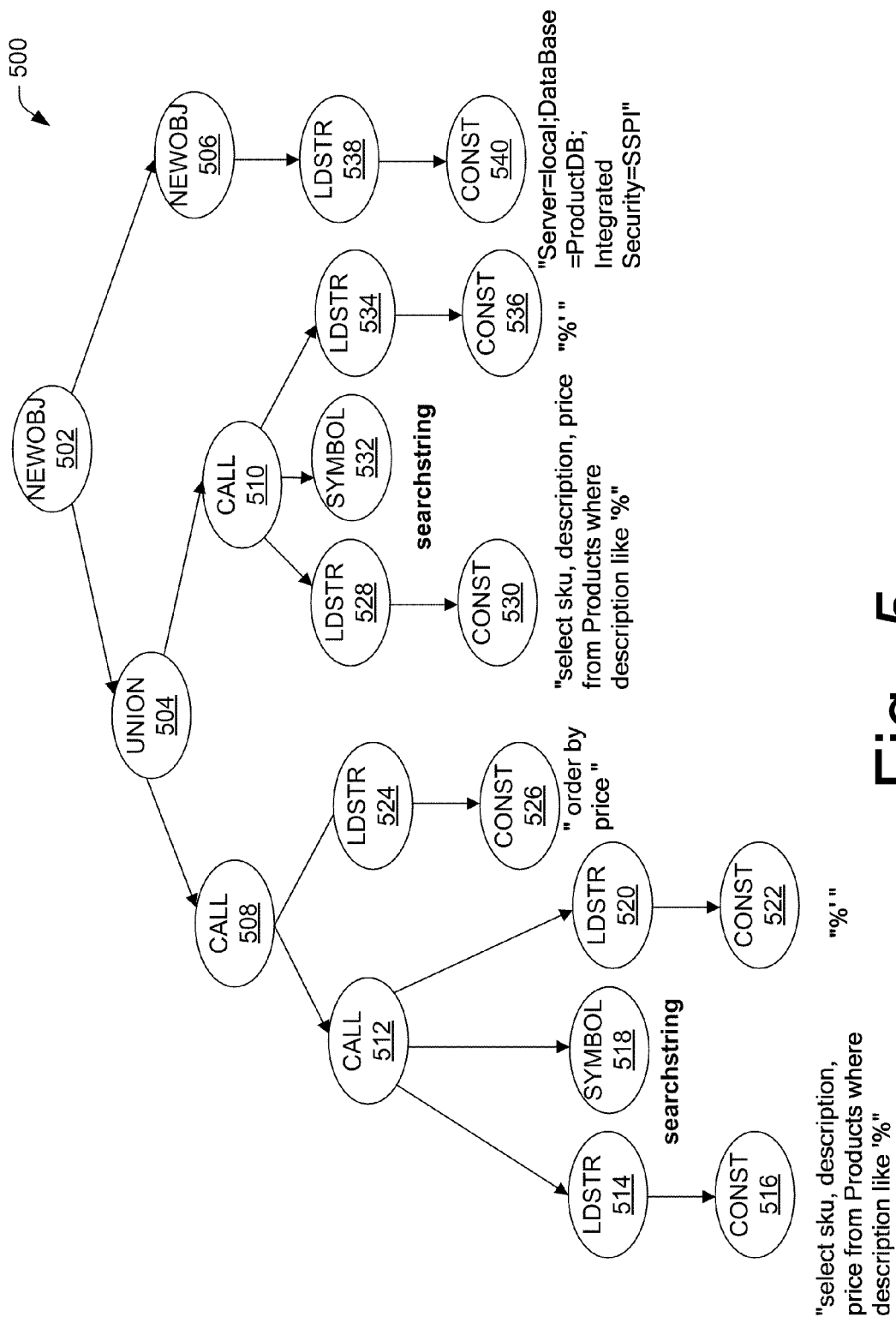
FIG. 5 illustrates an exemplary data flow tree for an exemplary object in an exemplary function.

The data flow tree corresponding to the value of cmd in the hash table is shown in FIG. 5 at 500. The data flow tree for the cmd symbol has a root at 502 and two sub-trees from nodes 504 and 506. These sub-trees correspond to the SQL text portion and the SQLConnection object portion of the SQL-Command constructor (Line 2 of LookupProduct in Code Example 1). The leaf nodes of the union at 504 corresponding to the SQL text part captures the static parts of the SQL (the embedded SQL strings) and the dynamic part (the search-string argument). Hence by traversing union 504, via nodes 508-526 or 530-536 and concatenating the leaf nodes of the appropriate branch, i.e., 508 or 510, (e.g., 516, 518, and 522, or 526 or 530, 532, and 536) the SQL executed at this line number may be extracted. In the illustrated embodiment, the subtree under newobj node 506 represents a connection string, which is not traversed.

In this example, the two CALL nodes 508 and 510 that are children of the UNION node 504 refer to string concatenation methods (e.g. System.String::Concat). In general, applications can build SQL strings at different places in the code and concatenate the fragments to build the SQL that is executed. Thus SAT 110 analyzes string concatenation API's to extract the set of strings that can be issued by the application at any call site. As another example, for a statement such as cmd.CommandText=a+b; where a and b are strings, to build the tree for cmd.CommandText SAT 110 would trace the CALL to the string concatenation function and concatenate the text contributed by the data flow trees for a and b.

In the illustrated example of FIG. 5, the UNION node 504 represents the case of the flow occurring over multiple paths (e.g., an If-Then-Else statement), and workload is extracted by concatenating the leaf nodes of the path. This is discussed in the context of global data flow analysis, below. Although the example illustrates the SAT 110 examining the ADO.NET API ExecuteReader, SAT 110 may also examine other ADO-.NET APIs in an analogous manner. For example, there are other APIs such as ExecuteNonQuery, and ExecuteScalar, where the application can potentially issue a SQL statement. As another example, SAT 110 also analyzes the various parameter collection APIs (e.g. System.Data.SqlClient.Sql-ParameterCollection::Add) in the data client name space for extracting properties (e.g. data types) of program variables that are bound to parameters of the SQL statement.

Global data flow analysis extends the analysis to operands defined in other basic blocks in the same or another function. In the examples of single block analysis described thus far, for any operand of interest, it was assumed that its definition could be traced within the basic block. While this is true for temporary variables defined within the block itself, certain operands (e.g. the program symbol searchstring in the LookupProduct function) may be defined in other basic blocks (within the same or in a different function). The purpose of global data flow analysis is to enable tracking the definition of the operand of interest beyond the current basic block.

Global data flow analysis accounts for the plurality of control paths to a call site such as ExecuteReader. Building on that described for a single basic block in the discussion of FIGS. 3, 4, and 5, SAT 110 first builds the data flow tree for operands within a basic block. If an operand cannot be resolved within the block, a backward traversal to one or more predecessor blocks in the call graph is performed until the operand's definition is obtained from the hash table of that block. Code Example 5, below presents a pseudo-code example algorithm for resolving an operand outside the current block.

Code Example 5

ResolveNode
Input: Current block C, Node N not resolved in C
Output: Resolved data flow tree for Node N
1. For each block B in the predecessor list of block C
2.    If N's data flow tree is in block B's hash table
3.       If N's data flow tree contains unresolved symbols
4.          For each symbol in the unresolved list
5.             ResolveNode(B,symbolnode)
6.       Else
7.          Replace symbol node N in current block with the data flow tree and mark as resolved
8.    Else // N's data flow tree not bound in block B
9.       ResolveNode (B,N)
10. If node N is referenced in more than one predecessor blocks
11.    Add a root UNION node with children as the data flow trees referenced in the predecessor blocks An example algorithm for resolving an operand (i.e., node) is shown in Code Example 5, above. In this example, SAT 110 recursively iterates over each predecessor of the current block. Thus, multiple resolutions (one per path) of the given operand N may occur. If multiple resolutions occur, then a UNION node whose children represent the alternatives is used to represent the alternate paths. Note, the predecessor block could be in the same or a different function unit—the SAT 110 applies the above algorithm to both cases. SAT 110 assigns block id numbers to the blocks in depth first order so that the block id of the current node is always greater than its predecessor. This property allows the SAT 110 to correctly deal with cycles caused by loops.

Figure 6:
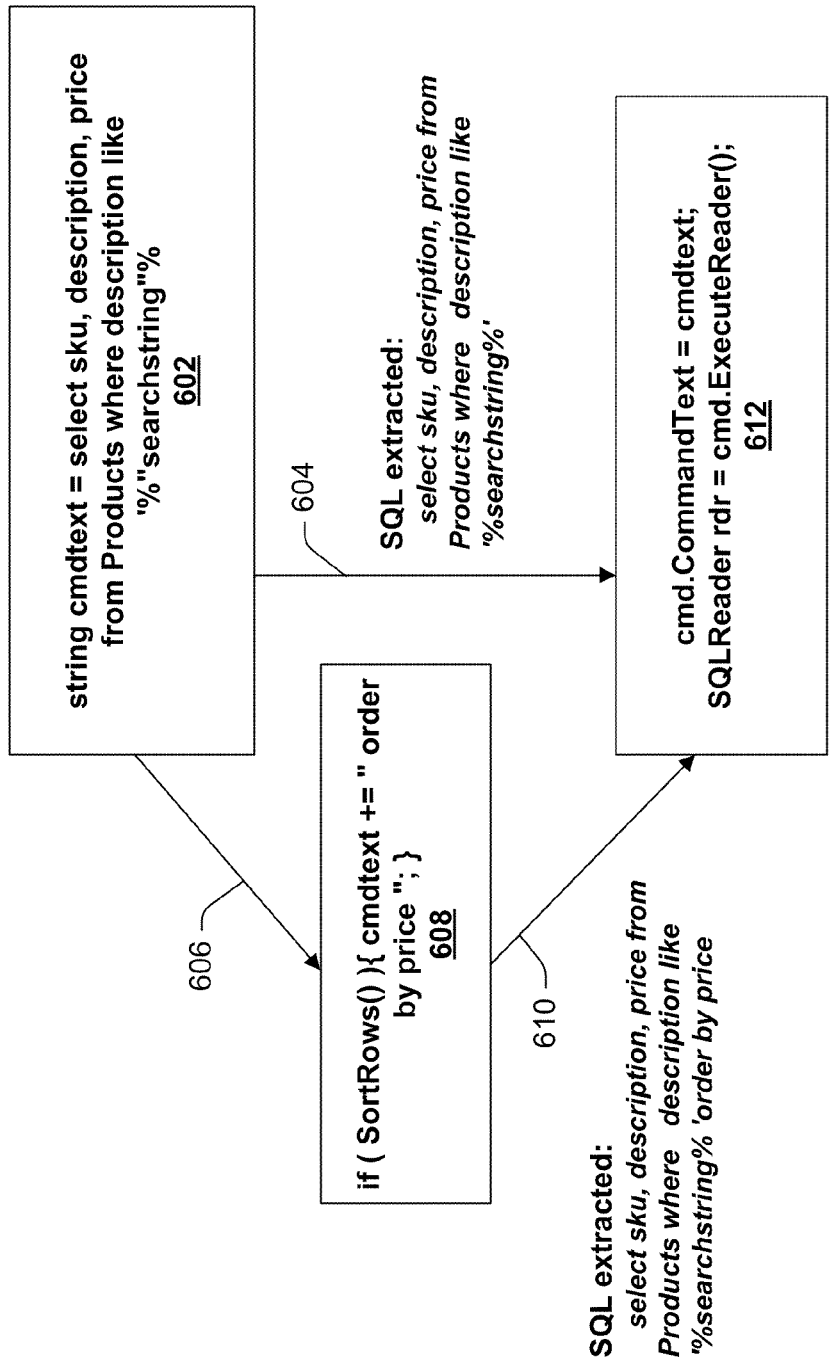
FIG. 6 illustrates an exemplary global data flow analysis of one embodiment.

FIG. 6 illustrates an example of global data flow analysis via the Extract SQL service 216 for the exemplary Lookup-Product function of Code Example 1 using the algorithm of Code Example 5 at 600. The basic block for cmdtext is shown at 602. Two SQL strings are extracted at the instruction corresponding to line 5 of Code Example 1. One, is the SQL extracted at 604 in an event SortRows( ) from line 3 of Code Example 1 returns negative. The second, in an event Sor-tRows( ) is positive at 606, appends order by price at 608 for inclusion in the SQL extracted at 610. Thus, two strings are possible (with or without the order by price clause) depending on the return value of SortRows( ). Although in FIG. 6 we show exemplary basic blocks, and two SQL strings extracted at the ExecuteReader instruction using our global data flow analysis, other numbers of blocks and SQL strings, and additional instructions are similarly analyzed via SAT 110.

In at least one embodiment, vertical tools 206, introduced in FIG. 2, are implemented on top of the functionality described referring to FIGS. 3-6. For example, SQL Injection Detection vertical 210 is implemented to detect attacks that occur when unvalidated user input is used to build a SQL string which is then executed on the database server. The adversary injects malicious SQL code in user input that gets executed by the query in the server.

The SQL injection detection tool 210 takes as input a set of function signatures that can supply user input to the program. For example, this includes a function such as System.Windows.Forms.Control::get_Text. Vertical 210 marks any destination operand in an instruction where the above function is a source operand as "tainted". For example, consider the follow IR instruction:

tv273=CALLVIRT* System.Windows.Forms.Control::get_Text, tv272

In the exemplary instruction above, destination operand tv273 is assigned the return value of get_Text and hence the node is marked UNSAFE. The data flow analysis outlined in the previous sections also propagates the "safety" attribute (SAFE, UNSAFE, MAYBE UNSAFE) from the source (where the user input is read) to the sink (call site where the SQL is executed). Therefore, in the case where user data is propagated to the SQL string without passing through any other functions, the resulting SQL will also be reported as UNSAFE.

If the user input is passed into a function (e.g. a validation function) whose return value is propagated to the SQL string, it is marked as MAYBE UNSAFE. If the user input is passed in as a parameter to the SQL (using one of the ADO.NET APIs for passing parameters), the SQL string is marked as SAFE. Note that the SQL that is executed and the sink line number are gathered by using the "Extract SQL" service 216. As described above, given a handle to the SQL statement we use the Analyze User Input service 224 to identify all user inputs in the program such that the user input value contributes to the SQL.

In typical applications, it is common that code where the user data is read in and where the SQL is actually executed are in different functions. In these scenarios the ability of the SAT 110 to perform inter-function analysis is utilized to analyze the database application.

As another example, Integrity Checking vertical 212 is implemented to enforce data integrity checks in the application code rather than using database integrity checking functionality such as CHECK constraints. The vertical tool 212 for detecting violations of data integrity constraints takes as input a set of constraints specified by the user. In at least one embodiment constraints of the form (Database. Table. Column Op Value), where Op is a comparison operator and Value is a literal are supported.

Each constraint expression input by the user is parsed to obtain the table and column on which the constraint is specified. During the data flow analysis discussed regarding FIGS. 3-6, above, the vertical tool 212 looks for INSERT or UPDATE statements on the object referenced in the input constraint expression. This is done by extracting the SQL statement for example, using the Extract SQL service 216, and parsing it to extract the table/column information as well as statement type (INSERT/UPDATE) ("Identify SQL Properties" service 218). SAT 110 also captures the association of the parameter name to the column in the INSERT/UPDATE statement by analyzing the ADO.NET APIs for passing parameters to SQL ("Extract Parameters" service 220). The ability of SAT 110 to capture the association of the parameter name to the column in the database, enables it to automatically recommend an assertion in the application code that will verify the data integrity constraint specified by the user. SAT 110 provides the application developer such a recommendation and an assertion in the code for review.

As discussed regarding FIG. 3, the SAT 110 takes the application binary as input. The user also specifies a database constraint. In the example shown in FIG. 7, the constraint shown is ([Products].[Price]>0). FIG. 7 illustrates a screenshot of a code sample for the example of detecting potential data integrity violation in the application code using integrity checking vertical 212 introduced regarding FIG. 2. In this example, the function button_insert_click inserts a row to the Products table in a database. The constraint to be enforced by the application is that the Price column of the Products table is greater than 0, i.e. [Products].[Price]>0.

FIG. 8 shows a screenshot of one implementation of the SAT 110 after the static analysis discussed regarding FIG. 7 is complete. The left pane 802 shows the classes and methods corresponding to the binary. In this example, the right pane 804 contains the following information. The fully formed SQL statement and the line number in the application where the SQL can execute are shown at 806. Information about the parameters that are bound to the SQL statement is illustrated at 808. These include the parameter name, the data type and the application variable that is bound to the SQL parameter. The application constraint corresponding to the input database constraint specified by the user and the line number where it should be added is shown at 810. In this example the Constraints Analysis pane 810 shows that expression (price1>0), where price1 is an application variable, will enforce the database constraint [Products].[Price]>0 if it is placed at line number 279 in the application code.

Exemplary Implementation

The following discussion describes an exemplary overview a variety of implementations of at least one embodiment of the static analysis framework for database applications. The implementations for applications discussed are merely illustrative, and not limiting. The discussion references elements discussed above regarding previous figures. The implementations discussed relate to operation of SAT 110 on several real world database applications such as Microsoft®'s Conference Management Toolkit (CMT), SearchTogether, and a security training application (STA).

CMT is a web application sponsored by Microsoft Research that handles workflow for an academic conference (available at http://msrcmtresearch.microsoft.com/cmt/). SearchTogether is a Microsoft® application that allows multiple users to collaborate on web search (available at http://research.microsoft.com/en-us/um/redmond/projects/search-together/).STA is an internal Microsoft® security training application developed by the security training group at Microsoft® to demonstrate SQL injection vulnerability.

For each of the three exemplary applications evaluation of the Workload Extraction vertical 208 is reported in Table 1, below. The methodology was to compare the workload extracted by SAT 110 via vertical 208 with the workload obtained by manual inspection of the application code. The summary of results is shown in Table 1.

TABLE 1

| Application | Lines of Code | Total # SQL statements | # SQL statements extracted |
| --- | --- | --- | --- |
| CMT | 36000+ | 621 | 350 |
| SearchTogether | 1700+ | 40 | 35 |
| STA | 500+ | 10 | 10 |

The column "Total # SQL statements" reports the number of that SQL statements manually identified by examining the source code of the application. The column "# SQL statements extracted" refers to the number of statements that were extracted by SAT 110. Along with the SQL statements SAT 110 extracted parameter information via Extract Parameter service 220 as well. Thus, even though actual parameter values are not known at compile time, SAT 110 is able to extract syntactically valid queries, e.g., it is possible to obtain a query execution plan for such queries. Note, the CMT and SearchTogether applications both mostly use parameterized stored procedures.

In at least one embodiment a select set of ADO.NET APIs are covered, for example, not all SQL strings were extracted by the SAT 110. In other embodiments, different sets of ADO.NET APIs may be covered. It is to be understood that expansion to a variety of sets of ADO.NET APIs as well as Open Database Connectivity (ODBC) APIs and Java Database Connectivity (JDBC™) APIs is expected to follow similar teachings and is considered within the scope of this document.

Furthermore, in SearchTogether, the SQLCommand object is a member variable of a class in some instances. The object is constructed in one method and referenced in another method. In this situation, the global data flow analysis of the test implementation is not sufficient since the variable (the SQLCommand object) is not passed across the two methods. In another implementation this case would be captured by the SAT tracking an additional state of the SQLCommand object, for example.

Figure 9:
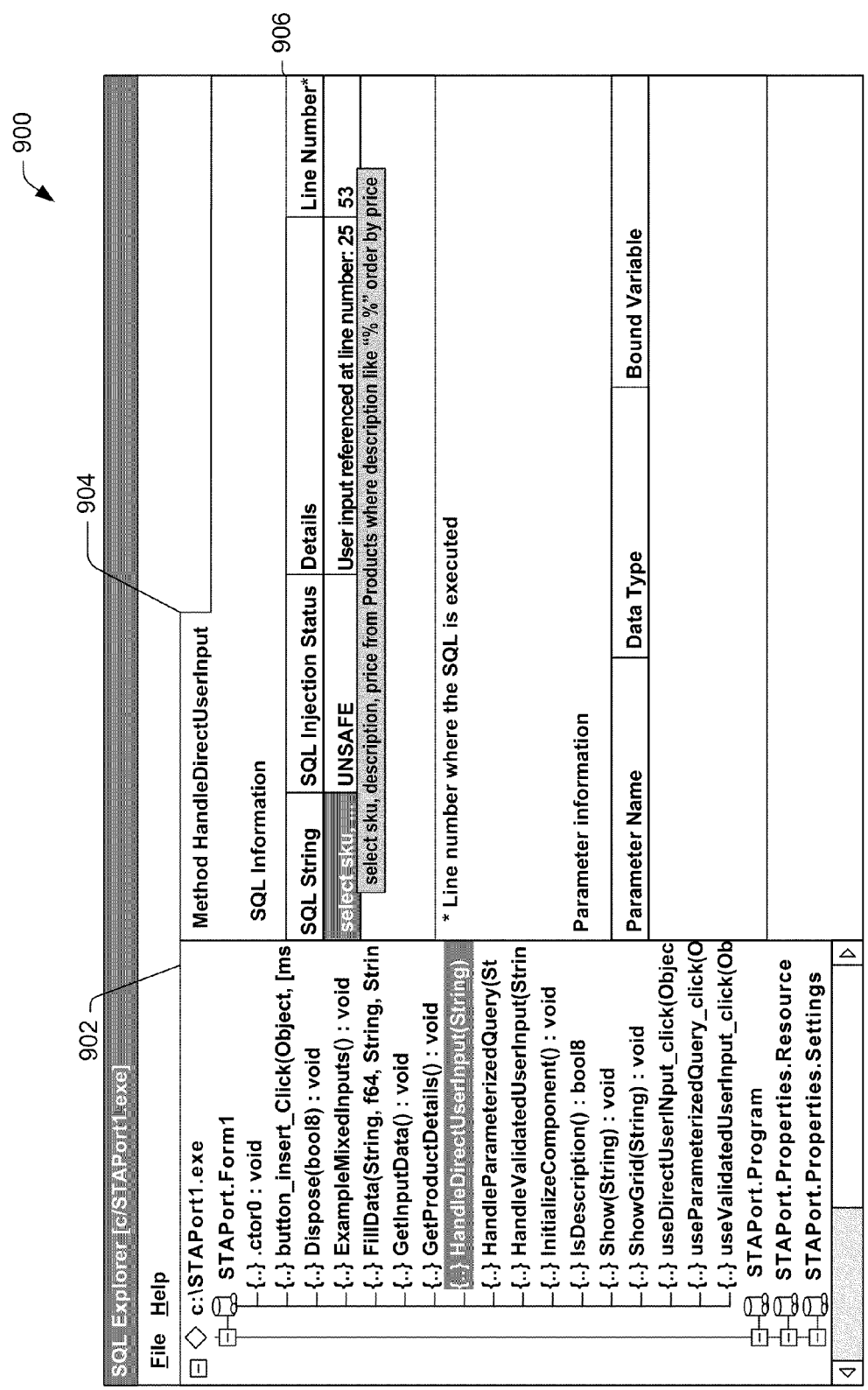
FIG. 9 illustrates an exemplary output of the SAT for SQL injection detection.

The SQL injection detection vertical 210 of SAT 110 was also run on the three applications. SAT 110 detected no SQL injection vulnerabilities in CMT and SearchTogether. In these applications user input is bound to parameters and executed as parameterized SQL. In STA, the security training application, SAT 110 identified the SQL injection vulnerabilities. FIG. 9 shows a screenshot of SAT 110 indicating the SQL injection vulnerability in one method. The left hand pane 902 shows the functions in the binary. In the right hand pane 904, the SQL Information grid 906 shows the SQL string and the SQL injection status (UNSAFE in this example). Grid 906 also shows the actual line number in the code where the user input (leading to this vulnerability) originated and the line number where the SQL statement is executed.

Exemplary Computing Device

Figure 10:
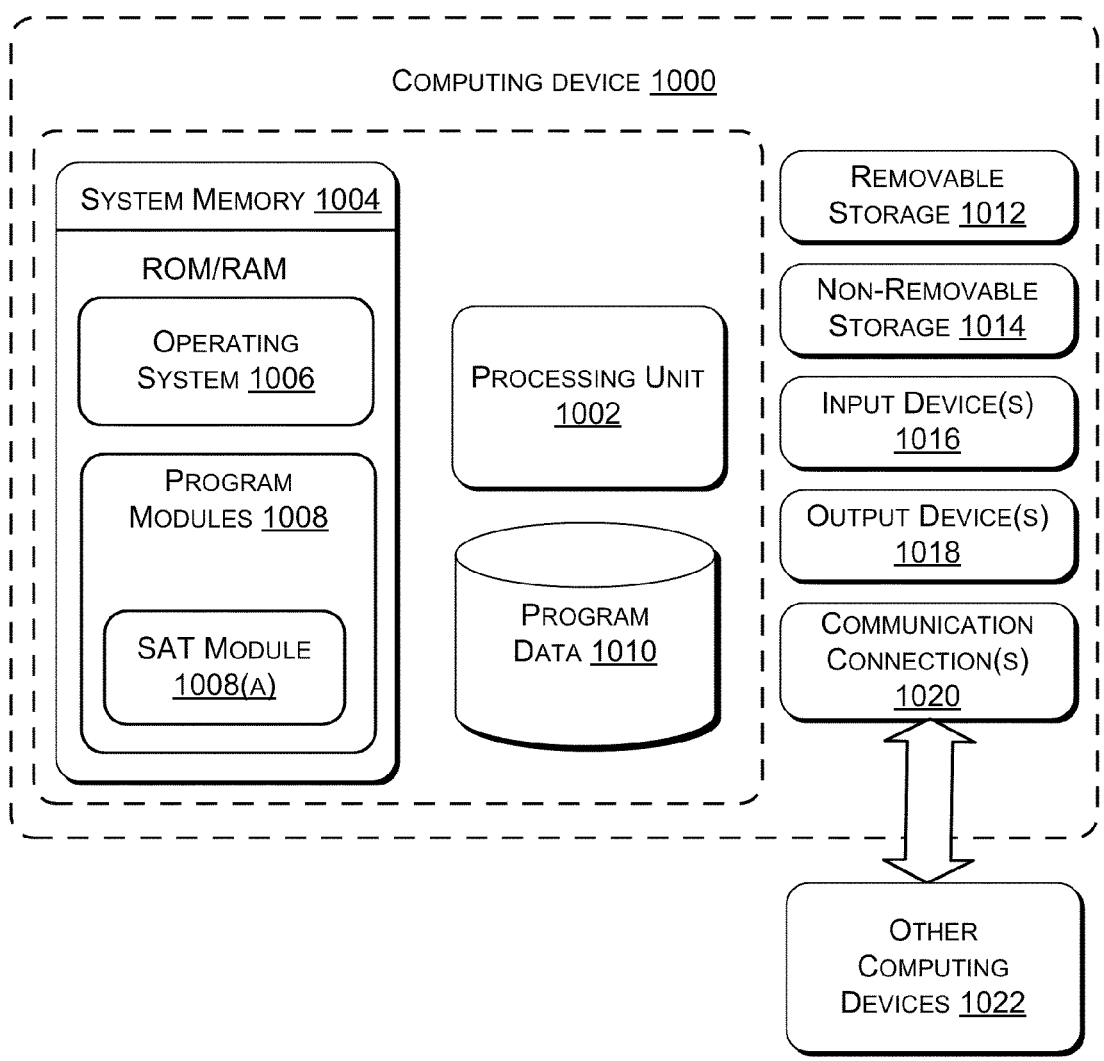
FIG. 10 illustrates an exemplary computing device for implementing an embodiment of the Static Analysis Framework for Database Applications.

FIG. 10 illustrates an exemplary computing device 1000 that can be used to implement tools applying the Static Analysis Framework for Database Applications.

For example, computing device 1000 can represent one or more of the computing devices 102, 108, and computing device server 106 operating in environment 100. (And insofar as the computing device 1000 includes conventional computing hardware, FIG. 10 also represents functionality that can be used to implement other computer-related aspects of the environment 100 shown in FIG. 1, such as equipment of server 106 and individual computer devices 102 and 108, including processing units, databases 114 (1 . . . *n*), program modules, compiler functionality 112 and so forth). The computing resources shown in FIG. 10 can be implemented at a single site or distributed over plural sites.

The computing device 1000 in this example includes at least one processing unit 1002 and system memory 1004. Depending on the configuration and type of computing device 1000, the system memory 1004 can be implemented as volatile memory (such as RAM), non-volatile memory (such as ROM, flash memory, etc.), or some combination of the two. The system memory 1004 can include an operating system 1006, one or more program modules 1008, program data 1010, and so forth. In the context of the present subject matter, the program modules 1008 can include 1008(A) the functionality for implementing the SAT 110 via services 204 and verticals 206 of FIG. 2. In at least one embodiment compiler functionality is implemented separately from the SAT Module, and in at least one other embodiment, the compiler is integrated with the SAT module. In general, the program modules 1008 can be implemented as computer-readable instructions, various data structures, and so forth that configure a computer to operate SAT 110. The computer-readable instructions can be expressed using any programming technology. The instructions can also include markup language content (e.g., XML).

The computing device 1000 can include additional features or functionality. For example, the computing device 1000 can also include additional data storage devices, such as removable storage 1012 (e.g., magnetic disks, magnetic tape, optical disks, static RAM devices, and so forth), and/or non-removable storage 1014 along with associated media reading/writing functionality. Removable storage 1012 may include a variety of computer-readable media.

The computing device 1000 can also include various input device(s) 1016, such as a keyboard, a mouse, a voice input device, a touch input device, and so on. The computing device 1000 can also include various output device(s) 1018, such as a display, speakers, printer, and so on. Finally, the computing device 1000 can also include a communication interface 1020 that allows the device 1000 to communicate with other computing devices 1022 over the network 104 of FIG. 1. The communication interface 1020 can be implemented in any fashion, such as broadband (e.g., T1) interface, a telephone modem interface, a cable modem interface, a DSL-type interface, and so forth. One or more bus structures (not shown) internally couple each of the above-described modules together.

Conclusion

The above-described tools, systems, and methods enable static analysis tools for database applications, such that the SAT can significantly enhance the ability for developers to identify security, correctness and performance problems in database applications during the development phase of an application lifecycle. This description of static analysis tools for database applications presents a framework for database applications using the ADO.NET data access APIs. The SAT framework consists of a core set of static analysis services. We have built verticals such as SQL injection detection, workload extraction and identifying data integrity violations using these services; and performed initial evaluation on real world database applications. These and other techniques described herein may provide significant improvements over the current state of the art, by leveraging data access APIs and database application binaries to provide a set of analysis services via a Static Analysis Tool (SAT). The SAT provides a framework for analyzing database application binaries to automatically identify security, correctness and performance problems in the database application via service tools and vertical tools.

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed tools, system and method.

We claim:

1. A computer-implemented method of database analysis, the method comprising:
   during code compilation of a database application via a computing device,
      performing extraction from the code via the computing device, the extraction comprising:
         extracting a set of SQL statements,
         extracting properties of the SQL statements, and
         extracting parameters used in SQL queries;

analyzing the extracted SQL statements, properties, and parameters to identify data flow;

based at least in part on the data flow, building verticals to perform at least one of: data integrity checking or SQL performance analysis;

based at least in part on the verticals, rewriting at least one of the SQL statements, parameters, or properties to optimize at least one of data integrity or security.

2. The method as recited in claim 1, wherein the extracted SQL statements conform to use with a first database management system;

wherein the building verticals further comprise workload extraction; and wherein the rewriting the at least one of the parameters, properties, and SQL statements further comprises rewriting SQL statements conforming to use with a second database management system.

3. The method as recited in claim 1, further comprising analyzing user input for parameter compliance.

4. The method as recited in claim 1, wherein the building verticals further comprise workload extraction, and wherein the analyzing identifies when at least one call in the code is common to workload extraction and SQL performance analysis.

5. The method as recited in claim 1, wherein at least one of the verticals comprises inter-function analysis to perform at least one of data integrity checking or SQL performance analysis.

6. A tangible computer readable storage media having computer-executable instructions embodied thereon, the computer-executable instructions upon execution configuring a computer to perform operations comprising:

during code compilation of a database application via a computing device, performing extraction from the code via the computing device, the extraction comprising:

extracting a set of SQL statements, extracting properties of the SQL statements, and extracting parameters used in SQL queries;

analyzing the extracted SQL statements, properties, and parameters to identify data flow;

based at least in part on the data flow, building verticals to perform at least one of: data integrity checking or SQL performance analysis;

based at least in part on the verticals, rewriting at least one of the SQL statements, parameters, or properties to optimize at least one of data integrity or security.

7. The tangible computer readable storage media as recited in claim 6, wherein the extracted SQL statements conform to use with a first database management system;

wherein the building verticals further comprise workload extraction; and wherein the rewriting the at least one of the parameters, properties, and SQL statements further comprises rewriting SQL statements conforming to use with a second database management system.

8. The tangible computer readable storage media as recited in claim 6, the operations further comprising analyzing user input for parameter compliance.

9. The tangible computer readable storage media as recited in claim 6, wherein the building verticals further comprise workload extraction, and wherein the analyzing identifies when at least one call in the code is common to workload extraction and SQL performance analysis.

10. The tangible computer readable storage media as recited in claim 6, wherein an inter-function analysis comprises:

identifying a node as a vulnerability to a database;

determining how information from the node is passed; and identifying the node as not being a vulnerability to the database if the information from the node is passed by limiting the vulnerability to the database.

11. The tangible computer readable storage media as recited in claim 10, wherein the information from the node comprises a user input.

12. The tangible computer readable storage media as recited in claim 10, wherein the information from the node being passed by limiting the vulnerability to the database comprises passing the information from the node using an ActiveX Data Objects for .NET (ADO.NET) application programming interface (API).

13. The tangible computer readable storage media as recited in claim 6, wherein at least one of the verticals comprises inter-function analysis to perform at least one of data integrity checking or SQL performance analysis.

14. The tangible computer readable storage media as recited in claim 6, wherein the rewriting at least one of the SQL statements, parameters, or properties is further to optimize performance.

15. A computing device comprising:

a processor; and a memory operably coupled to the processor and storing instructions to configure the computing device to perform operations comprising:

during code compilation of a database application via the computing device, performing extraction from the code via the computing device, the extraction comprising:

extracting a set of SQL statements, extracting properties of the SQL statements, and extracting parameters used in SQL queries;

analyzing the extracted SQL statements, properties, and parameters to identify data flow;

based at least in part on the data flow, building verticals to perform at least one of: data integrity checking or SQL performance analysis; and based at least in part on the verticals, rewriting at least one of the SQL statements, parameters, or properties to optimize at least one of data integrity or security.

16. The computing device as claim 15 recites, wherein the extracted SQL statements conform to use with a first database management system;

wherein the building verticals further comprise workload extraction; and wherein the rewriting the at least one of the parameters, properties, and SQL statements further comprises rewriting SQL statements conforming to use with a second database management system.

17. The computing device as claim 15 recites, the operations further comprising analyzing user input for parameter compliance.

18. The computing device as claim 15 recites, wherein the building verticals further comprise workload extraction, and wherein the analyzing identifies when at least one call in the code is common to workload extraction and SQL performance analysis.

19. The computing device as claim 15 recites, wherein at least one of the verticals comprises inter-function analysis to perform at least one of data integrity checking or SQL performance analysis.

* * * * *